United States Patent Office 2,955,929
Patented Oct. 11, 1960

2,955,929
WEED KILLERS

David E. Ramey, William J. Hughes, and Johannes Van Overbeek, Modesto, Calif., assignors to Shell Oil Company, a corporation of Delaware No Drawing. Filed Mar. 18, 1958, Ser. No. 722,145

10 Claims. (Cl. 71—2.3)

The present invention relates to herbicidal compositions and is particularly directed to a method for the selective control of noxious grasses, particularly crabgrass. Secondary alkyl and cycloalkyl trinitroxylenes, particularly trinitro-m-xylenes, such as 5-sec-butyl-2,4,6-trinitro-m-xylene constitute the active ingredients of these compositions. It has been discovered that these compounds possess unexpectedly high herbicidal potency against crabgrass yet exhibit little or no effect on corn, oats, soybean, cotton, and the like. They are particularly valuable for pre-emergence weed-killing, that is, elimination of weeds from a planted agricultural area prior to emergence of the weeds.

The invention encompasses ortho-, meta- and para-xylenes. The meta-xylenes, particularly contemplated by the present invention, may be defined by the following structural formula:

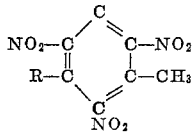

wherein R represents a secondary alkyl group (including alicyclic) of up to 10 carbon atoms. Compounds wherein R is a straight chain secondary alkyl group of up to 10 carbons are considered of the greatest value and constitute the preferred compounds of the present invention. Specific examples of compounds encompassed by the present invention are: 5-sec-decyl-2,4,6 - trinitro - m - xylene; 5-sec-butyl-2,4,6-trinitro-m-xylene; 5-cyclohexyl-2,4,6-trinitro-m-xylene; 5-cyclopentyl - 2,4,6 - trinitro - m - xylene; 5-(1-methylpentyl)-2,4,6-trinitro-m-xylene; 5 - (1-methylbutyl)-2,4,6-trinitro-m-xylene; 5 - isopropyl-2,4,6-trinitro-m-xylene; 5-sec-decyl-3,4,6-trinitro - o - xylene; and 5-sec-butyl-2,3,6-trinitro-p-xylene.

Compounds of the present invention may be prepared by alkylation of xylene in the presence of aluminum chloride or another alkylation catalyst, followed by nitration.

The following examples illustrate preparations of compounds employed for the purposes of the present invention.

Example I.—5-sec-butyl-2,4,6-trinitro-m-xylene

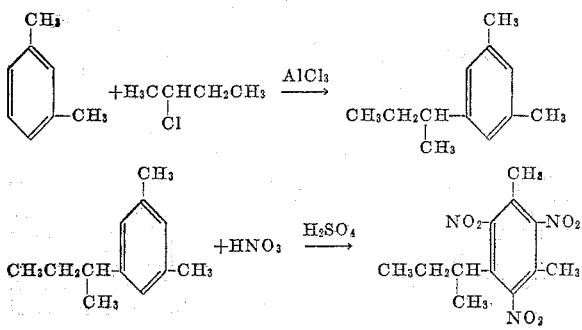

Sec-butyl chloride, 218 g., was added dropwise to m-xylene, 250 g., with aluminum chloride, 40 g., suspended therein. The reaction mixture was cooled with an ice-water bath and maintained at a temperature of 15–20°. The reaction mixture was poured into iced concentrated HCl, and the resulting mixture was extracted with ether, water washed and dried over anhydrous $Na_2SO_4$. The oil was distilled and 278 g., B.P. 104–106°, 25 mm., collected.

Fuming nitric acid (density 1.5), 350 g., was added dropwise with stirring and cooling to 250 ml. concentrated sulfuric acid. The sec-butyl-m-xylene was then added dropwise with cooling at 10–25°. After standing overnight the mixture was poured onto ice. The mixture was then extracted with ether and the ether extract washed with water and alkaline solution, dried with anhydrous $Na_2SO_4$ yielding an oil after ether evaporation. After stripping off solvent at high vacuum, the oil was renitrated by adding fuming $HNO_3$ in concentrated sulfuric acid to the hydrocarbon while maintaining the temperature under 40°. The solid was collected, washed with water and alkaline solution, air dried and recrystallized twice from ether and once from methanol to give 274 g., M.P. 88–89°.

| | Percent C | Percent H |
|---|---|---|
| Calculated for $C_{12}H_{15}N_3O_6$ | 48.4 | 5.01 |
| Found | 48.1 | 5.1 |

Example II.—5-isopropyl-2,4,6-trinitro-m-xylene

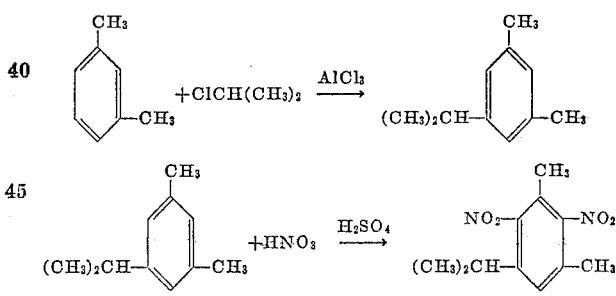

The isopropyl chloride, 58.9 g., was added slowly dropwise to the m-xylene, 106 g., and aluminum chloride, 10 g., in suspension at 5–15°. The addition required about 45 minutes. The reaction mixture was then warmed to room temperature. After standing overnight, the reaction mixture was poured into iced HCl acid. Separation of the oil, water washing, drying with anhydrous $Na_2SO_4$, and distilling over sodium gave 5-isopropyl-m-xylene.

Fuming nitric acid (density 1.5), 105 ml., was added dropwise with stirring and cooling to 145 ml. concentrated sulfuric acid. Isopropyl-m-xylene, 50 g., was added dropwise with stirring and cooling at about 20° over a period of 1½ hours and stirred at room temperature for another 3 hours. The semi-solid oily liquid was poured onto cracked ice and the waxy solid collected and water washed several times. The solid was taken up in 700 ml. of 95% ethanol, filtered and cooled. The resulting yellow solid (70 g.) was recrystallized from hexane to give a solid, M.P. 105–108° which was recrystallized from 95% ethanol to give 39 g., M.P. 115–117°,

Example III.—5-(1-methylbutyl)-2,4,6-trinitro-m-xylene

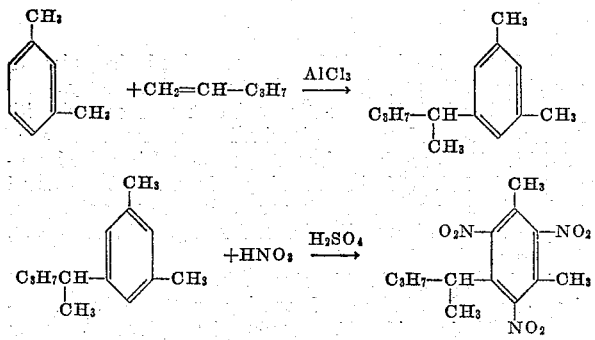

The m-xylene, 120 g., and the AlCl$_3$, 40 g., were stirred at 10–15° during addition of the 52.5 g. pent-1-ene over a period of one hour. After standing overnight, the mixture was poured onto a mixture of 100 ml. of concentrated HCl and 100–200 g. of cracked ice, extracted with pentane, water washed, dried over Na$_2$SO$_4$ and distilled. One hundred eleven grams, B.P. 101.5–104°, 12 mm. pressure, was collected and redistilled yielding 98 g. B.P. 100.5–101.5°, 11 mm. pressure.

The HNO$_3$ (density 1.5), 67 ml. was dropped into the concentrated H$_2$SO$_4$, 100 ml., with cooling. The 5-(1-methylbutyl)-m-xylene, 60 g., was then added with stirring at 10–20°, stirred at room temperature for another two hours and poured onto ice. The mixture was extracted with pentane three times and the combined pentane extracts washed with water and NaHCO$_3$ until neutral, dried over Na$_2$SO$_4$, filtered and concentrated. The oily residue was renitrated by dropping into a mixture of 40 ml. of HNO$_3$ and 60 ml. of concentrated H$_2$SO$_4$ and the reaction mixture worked up as before. After standing several days, some crystals had formed so the mixture was diluted with pentane and the crystals collected. After several recrystallizations from pentane and hexane, the crystals melted at 82–86°.

|  | Percent C | Percent H |
|---|---|---|
| Calculated for C$_{13}$H$_{17}$N$_3$O$_6$ | 50.2 | 5.5 |
| Found | 50.5 | 5.5 |

Example IV.—5-(1-methylpentyl)-2,4,6-trinitro-m-xylene

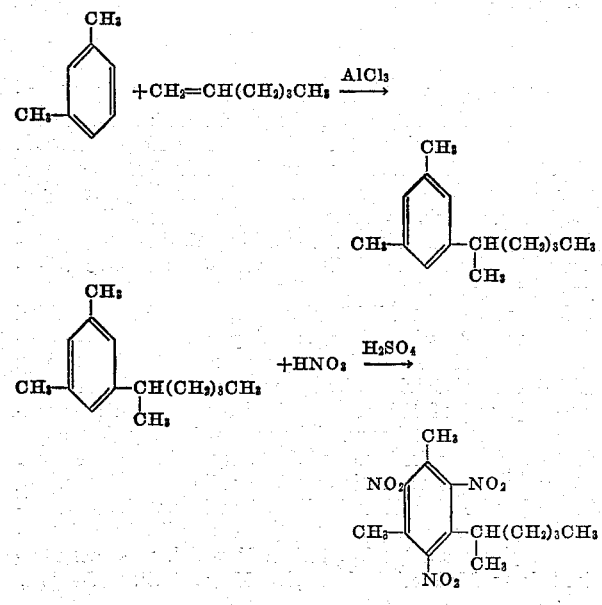

The 5-(1-methylpentyl)-m-xylene, 96.5 g., was prepared by reacting hex-1-ene, 84 g., with m-xylene, 100 g., and aluminum chloride, 5 g., in suspension at 15–20° over a period of 45 minutes. It was stirred at room temperature and warmed to 30° for 30 minutes and then stirred at room temperature for 2 hours. The reaction mixture was then warmed on a steam bath for 15 minutes and poured onto iced concentrated HCl to give an oil which was washed, dried and distilled, B.P. 116–119° at 14 mm.

The nitrating mixture was then made by adding fuming nitric acid (density 1.5), 88 ml., to concentrated sulfuric acid, 200 ml., with cooling. The 5-(1-methylpentyl)-m-xylene, 96 g., was then added slowly and the temperature maintained at 10–20° throughout the addition period of one hour. The reaction mixture was stirred for two hours and then heated on the steam bath for ½ hour. Pouring onto ice and extracting with ether gave an emulsion which was filtered and washed with a 10% alkaline solution and allowed to separate. The ether solution was filtered and washed with water, dried over anhydrous Na$_2$SO$_4$. Evaporation of ether yielded an oil which was stripped at high vacuum. The oil was renitrated at 85° for ½ hour using 44 ml. fuming HNO$_3$ and 350 ml. concentrated sulfuric acid and worked up as before. The resultant waxy solid was triturated with methanol, dissolved in ether, dried, ether evaporated, dissolved in methanol and allowed to stand overnight in ice water. Fourteen grams of a solid, M.P. 44–50°, was isolated. Two recrystallizations of this solid by dissolving in methanol and solvent evaporation gave 9 g., M.P. 55–55.5°.

|  | Percent C | Percent H |
|---|---|---|
| Calculated for C$_{14}$H$_{19}$N$_3$O$_6$ | 51.8 | 5.8 |
| Found | 51.8 | 5.8 |

The total nitrated product in this example was a mixture of isomers. The small amount of solid obtained was assumed to have the indicated structure.

Example V.—5-cyclohexyl-2,4,6-trinitro-m-xylene

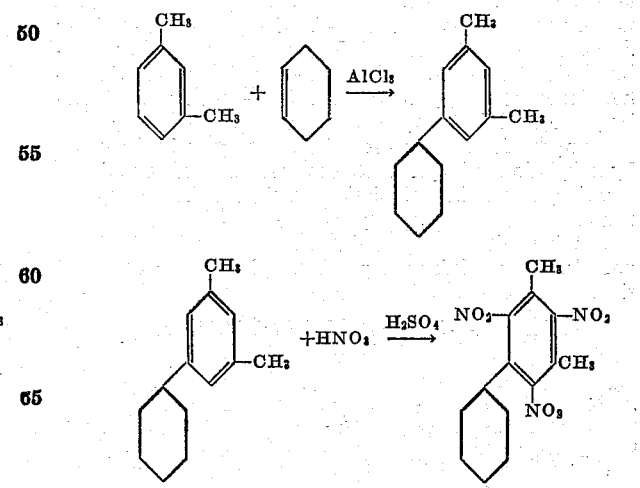

The cyclohexene, 200 g., was added dropwise to the AlCl$_3$, 100 g., and xylene, 300 g., over a period of 2½ hours at 15–25°. After an additional hour at room temperature, it was poured over ice and 250 ml. of concentrated HCl, extracted four times with pentane, water washed and dried over Na$_2$SO$_4$. The material was then stripped at the steam bath and distilled through a 50 cm. helices packed column yielding 352 g., B.P. 118–120° at 3.0 mm.

Sulfuric acid, 100 g., was placed in a flask and the $HNO_3$ (density 15), 100 g., was added dropwise over a period of 30 minutes with ice water cooling. The 5-cyclohexyl-m-xylene, 72 g., was added dropwise over a period of 1½ hours at 15–20°. Cooling was then discontinued and the temperature allow to rise for two hours. The reaction mixture was poured into ice water and the resulting waxy solid washed several times with water, taken up in ether, and the water layer drained off. The ether solution was filtered to remove a small amount of solid and dried briefly over sodium sulfate, filtered and evaporated. It was further concentrated, 95% ethyl alcohol added, and the resulting pale yellow solid collected and recrystallized yielding 30 g., M.P. 118–119°.

|  | Percent C | Percent H |
| --- | --- | --- |
| Calculated $C_{14}H_{17}N_3O_6$ | 52.0 | 5.3 |
| Found | 51.9 | 5.6 |

*Example VI.—5-cyclopentyl-2,4,6-trinitro-m-xylene*

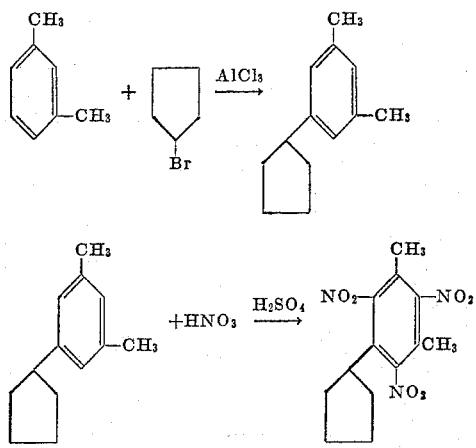

The $AlCl_3$, 40 g., and xylene, 100 g., were stirred at 10–15° during the dropwise addition of the cyclopentyl bromide, 72 g., over a period of 40 minutes. After addition was complete, the temperature was allowed to rise to room temperature. After standing overnight, the mixture was poured into ice and hydrochloric acid and extracted with pentane. The pentane extracts were dried overnight over $Na_2SO_4$, distilled and redistilled to yield 39 g., B.P. 121–122 at 12 mm.

Fuming nitric acid, 100 g., was added dropwise with stirring to concentrated sulfuric acid, 100 ml. The cyclopentyl xylene, 39 g., was added dropwise with cooling and stirring at 10–20° for 45 minutes followed by stirring for two hours. The product was then poured into ice and the resulting waxy solid collected, water washed, washed with 5% $NaHCO_3$ solution, rewashed with water, and crystallized from a mixture ethanol and ether to give 32 g., M.P. 106–108°.

|  | Percent C | Percent H |
| --- | --- | --- |
| Calculated for $C_{13}H_{15}N_3O_6$ | 50.5 | 4.0 |
| Found | 49.8 | 4.9 |

The following table shows the potency and surprising selectivity of 5-sec-butyl-2,4,6-trinitro-m-xylene toward crabgrass. In the table the effectiveness of 5-sec-butyl-2,4,6-trinitro-m-xylene has been compared with the known herbicides isopropyl N-(3-chlorophenyl)carbamate (CIPC) and α-chloro-N,N-diallylacetamide (CDAA). All tests were conducted under controlled conditions upon potted plants in the greenhouse.

| Compound | 1–2 Pound/Acre Rate | | | | |
| --- | --- | --- | --- | --- | --- |
|  | Crabgrass | Oats | Corn | Soybean | Cotton |
| 5-sec-butyl-2,4,6-trinitro-m-xylene | + | 0 | 0 | 0 | 0 |
| CIPC | + | : | 0 | 0 | 0 |
| CDAA | + | + | 0 | : | : |

| Compound | 2.5–5 Pound/Acre Rate | | | | |
| --- | --- | --- | --- | --- | --- |
|  | Crabgrass | Oats | Corn | Soybean | Cotton |
| 5-sec-butyl-2,4,6-trinitro-m-xylene | + | 0 | 0 | 0 | 0 |
| CIPC | + | + | + | : | 0 |
| CDAA | + | + | 0 | + | + |

+ = kill or severe growth inhibition.
0 = no effect on growth.
: = slight growth inhibition.

In another test crabgrass seed (*Digitaria sanguinalis*) was scattered on a well-established blue grass (*Poa pratensis*) lawn. On the same day the lawn was sprayed with emulsions of 5-sec-butyl-2,4,6-trinitro-m-xylene at the rate of five and ten pounds per acre. About twelve weeks later the crabgrass plants were counted. Five and ten pound rates gave an 80% reduction in crabgrass stand. These results were considered most remarkable in light of the fact that a two-month interval existed between the time of spraying and the time the crabgrass became active.

The following table based on greenhouse tests shows the surprising potency and selectivity toward crabgrass of the compounds of the present invention when tested under controlled conditions in greenhouse soil.

| Compound | Crabgrass Control | Condition of Corn, Oats, Soybean and Cotton Plants |
| --- | --- | --- |
| 5-sec-butyl-2,4,6-trinitro-m-xylene | 2 | All plants near normal. |
| 5-sec(1-methylbutyl)-2,4,6-trinitro-m-xylene. | 1 | Cotton, soybeans unaffected. |
| 5-cyclopentyl-2,4,6-trinitro-m-xylene. | 2 | All plants near normal. |
| 5-(1-methylpentyl)-2,4,6-trinitro-m-xylene. | 3 | Do. |

Excellent results was also obtained with 5-cyclohexyl-2,4,6-trinitro-m-xylene and 5-isopropyl-2,4,6-trinitro-m-xylene. The numbers 1–3 represent the comparative effectiveness of the compounds tested in controlling crabgrass. Number 1 represents the most effective, and number 3 represents the least effective crabgrass control observed.

In all cases crabgrass control was obtained at the 1–2 pound/acre level, however. 5-(1-methylpentyl)-2,4,6-trinitro-m-xylene was the most selective of the compounds found effective against crabgrass in that it had no perceptible effects on corn, oats, soybean or cotton. 5-(1-methylbutyl)-2,4,6-trinitro-m-xylene was the most effective compound tested on crabgrass but effected the growth of the corn and oats to some degree.

If desired, the herbicidally active compound of the present invention may be applied by spraying. Spraying may be performed with aqueous emulsions or suspensions of the active agents. If desired, a minor amount of a wetting agent may be added. Particularly suitable wetting agents are the sodium salts of a mixture of secondary heptadecyl sulfates sold commercially under the name of "Teepol" and polyethylene glycol ethers of alkyl phenols sold under the trade name of "Triton X–100" and "Triton X–155."

A further form in which the herbicidal compounds of the present invention may be applied consists of solutions of the active ingredients in suitable inert liquid or semi-solid diluents in which the active ingredient is present in molecularly dispersed form. Suitable inert solvents should not be readily inflammable, as odorless as possible, and without any toxic effect. Neither should they be corrosive to the storage vessel. Examples of suitable solvents are high boiling oils, e.g., oils of vegetable origin such as castor oil, etc., and lower boiling solvents with a flash point of at least 30° C., such as carbon tetrachloride, ethylene dichloride, acetylene tetrachloride, sorbent naphtha, etc. Mixtures of solvents may also be used. Non-aromatic petroleum oils and xylene are commonly employed.

Application may also be made in the form of dusts utilizing as the inert vehicle such materials as tricalcium phosphate, precipitated chalk, bentonite, kaolin and kieselguhr. These compounds may also be employed in the form of aerosols.

The concentrations of the compounds employed in the present herbicidal compositions may vary considerably without departing from the scope of the invention. Thus the active herbicidal compound may be employed in concentrations ranging from less than 1% by weight to more than 50% based upon the total weight of the composition. The concentration of the compound used is dependent upon many factors, including the particular compound utilized, the carrier employed and the methods and conditions of application. A proper resolution of these factors is within the skill of those well versed in the herbicide art.

The m-xylene compounds of the present invention may be employed alone or in combination with other m-xylene compounds of the present invention. These m-xylenes may also be combined with other herbicidal, fungicidal, insecticidal, or acaricidal materials, the action of which may be either internal or external, with plants nutritives, plant hormones, and the like.

We claim as our invention:

1. A method for the destruction of weeds comprising treating the locus of weed infestation with an herbicidally effective amount of a trinitro-xylene compound having as one substituent a secondary alkyl group of up to 10 carbon atoms.

2. A method for the desruction of weeds comprising treating the locus of weed infestation with an herbicidally effective amount of a xylene compound of the formula

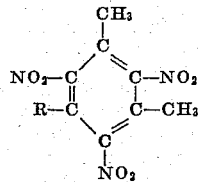

wherein R is a secondary alkyl group of up to 10 carbon atoms.

3. A method for the destruction of weeds comprising treating the locus of weed infestation with an herbicidally effective amount of a xylene compound of the formula

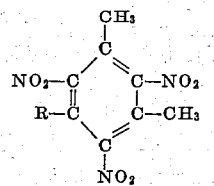

wherein R is a secondary alicyclic group of up to 10 carbon atoms.

4. A method for the destruction of weeds comprising treating the locus of weed infestation with an herbicidally effective amount of a xylene compound of the formula

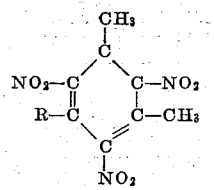

wherein R is a secondary straight chain alkyl group of up to 10 carbon atoms.

5. A method for the destruction of weeds comprising treating the locus of weed infestations with an herbicidally effective amount of 5-sec-butyl-2,4,6-trinitro-m-xylene.

6. A method for the destruction of weeds comprising treating the locus of weed infestation with an herbicidally effective amount of 5-cyclohexyl-2,4,6-trinitro-m-xylene.

7. A method for the destruction of weeds comprising treating the locus of weed infestations with an herbicidally effective amount of 5-cyclopentyl-2,4,6-trinitro-m-xylene.

8. A method for the destruction of weeds comprising treating the locus of weed infestation with an herbicidally effective amount of 5-(1-methylbutyl)-2,4,6-trinitro-m-xylene.

9. A method for the destruction of crabgrass comprising treating the locus of crabgrass infestation with an herbicidally effective amount of 5-sec-butyl-2,4,6-trinitro-m-xylene.

10. A method of the destruction of weeds comprising treating the locus of weed infestation with an herbicidally effective amount of a trinitroxylene compound having as one substituent a secondary alicyclic group of up to 10 carbon atoms.

References Cited in the file of this patent
UNITED STATES PATENTS

| | | |
|---|---|---|
| Re. 22,944 | Carpenter | Dec. 2, 1947 |
| 451,847 | Baur | May 5, 1891 |
| 2,023,565 | Wirth | Dec. 10, 1935 |
| 2,072,293 | Carpenter | Mar. 2, 1937 |